United States Patent [19]
Brakebill et al.

[11] 4,074,855
[45] Feb. 21, 1978

[54] ADJUSTABLE BIMETAL CONSTRUCTION AND METHOD OF MAKING THE SAME

[75] Inventors: Harold G. Brakebill, Richmond, Va.; Jay L. Lewis; Clarence M. Asbill, III, both of Knoxville, Tenn.

[73] Assignee: Robertshaw Controls Company, Richmond, Va.

[21] Appl. No.: 690,070

[22] Filed: May 26, 1976

[51] Int. Cl.² ............................................. G01K 5/62
[52] U.S. Cl. ................................. 236/87; 73/363.3; 337/370
[58] Field of Search ................ 236/87, 101 B, 101 E, 236/101 R, 80 C; 337/370, 335; 73/363.1, 363.3; 60/529

[56] References Cited

U.S. PATENT DOCUMENTS

| | | | |
|---|---|---|---|
| 1,760,470 | 5/1930 | Bouillon | 337/370 |
| 2,249,582 | 7/1941 | Strobel | 73/363.1 X |
| 2,601,028 | 6/1952 | Kersten | 337/335 |
| 3,813,034 | 5/1974 | Lewis et al. | 236/87 |

Primary Examiner—William E. Wayner
Attorney, Agent, or Firm—Candor, Candor & Tassone

[57] ABSTRACT

An adjustable bimetal construction adapted to provide an adjustable throttling range and having a first bimetal member and a second bimetal member, one opposed end of the first bimetal member being operatively interconnected to the frame while the other end thereof is movable relative to the frame and one opposed end of the second bimetal member also being operatively interconnected to the frame while the other end thereof is movable relative to the frame. A device operatively interconnects the other ends of the bimetal members together to provide a combined bimetal action at the other ends thereof which can be adjusted through different positions of the device.

15 Claims, 8 Drawing Figures

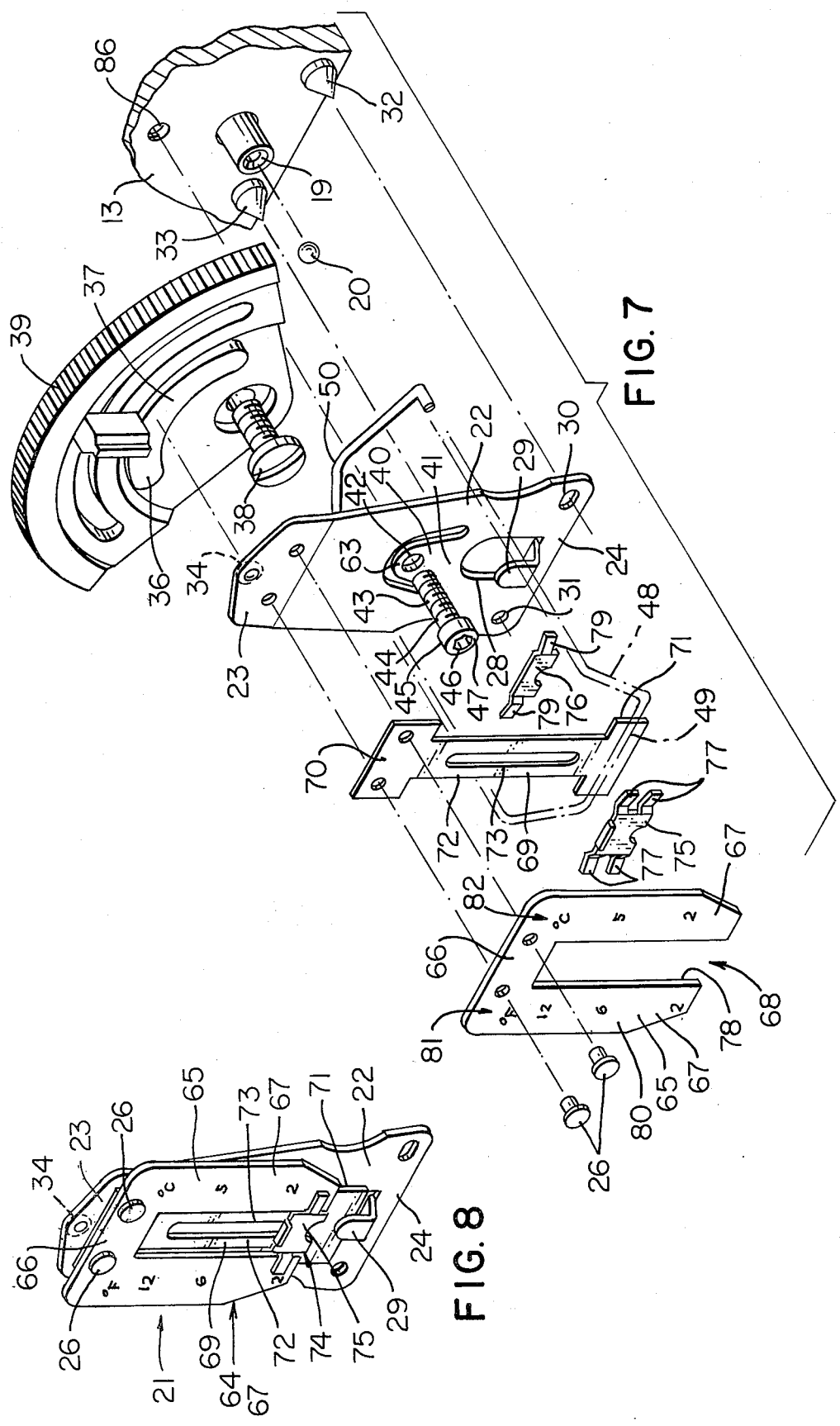

ADJUSTABLE BIMETAL CONSTRUCTION AND METHOD OF MAKING THE SAME

This invention relates to an improved adjustable bimetal construction and to a method of making the same as well as to a temperature responsive device utilizing such adjustable bimetal construction.

It is well known that temperature responsive devices utilize bimetal constructions for controlling operable members thereof. For example, see U.S. Pat. No. 3,813,034 wherein a temperature responsive device is provided and has a lever carried by a support means. A bimetal member has one of its opposed ends secured to one of the opposed ends of the lever whereby the other end of the bimetal member is operatively associated with an operable member of the support means to operate the same.

It is a feature of this invention to provide an improved bimetal construction for such a temperature responsive device or the like wherein the bimetal construction is adjustable to provide an adjustable throttling range for the device.

In particular, one embodiment of this invention provides an adjustable bimetal construction having a frame means. A first bimetal member has one opposed end thereof operatively interconnected to the frame means while the other opposed end is movable relative to the frame means. A second bimetal member has one opposed end thereof also operatively interconnected to the frame means while the other opposed end thereof is movable relative to the frame means. An adjustable means operatively interconnects the other ends of the bimetal members together to provide a combined bimetal action at the other ends thereof which can be adjusted upon the changing of the position of the adjustable means relative to the bimetal members.

Accordingly, it is an object of this invention to provide an improved adjustable bimetal construction having one or more of the novel features set forth above or hereinafter shown or described.

Another object of this invention is to provide a method of making such an adjustable bimetal construction, the method of this invention having one or more of the novel features set forth above or hereinafter shown or described.

Another object of this invention is to provide a temperature responsive device utilizing such an adjustable bimetal construction.

Other objects, uses and advantages of this invention are apparent from a reading of this description which proceeds with reference to the accompanying drawing forming a part thereof and wherein:

FIG. 7 is an exploded perspective view of certain parts of the temperature responsive device of FIGS. 1-6.

FIG. 8 is a perspective view of the adjustable bimetal construction utilized for the temperature responsive device of FIGS. 1-6.

Figure 1:
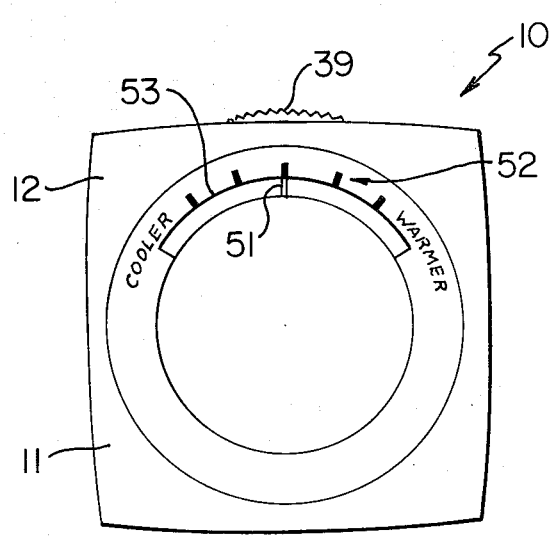
FIG. 1 is a front view of the temperature responsive device of this invention.

While the various features of this invention are hereinafter described and illustrated as being particularly adapted to be utilized with the temperature responsive device of the aforementioned U.S. Pat. No. 3,813,034, it is to be understood that the various features of this invention can be utilized singly or in any combination thereof to provide an adjustable bimetal construction for other devices as desired.

Therefore, this invention is not to be limited to only the embodiment illustrated in the drawings, because the drawings are merely utilized to illustrate one of the wide variety of uses of this invention.

Figure 3:
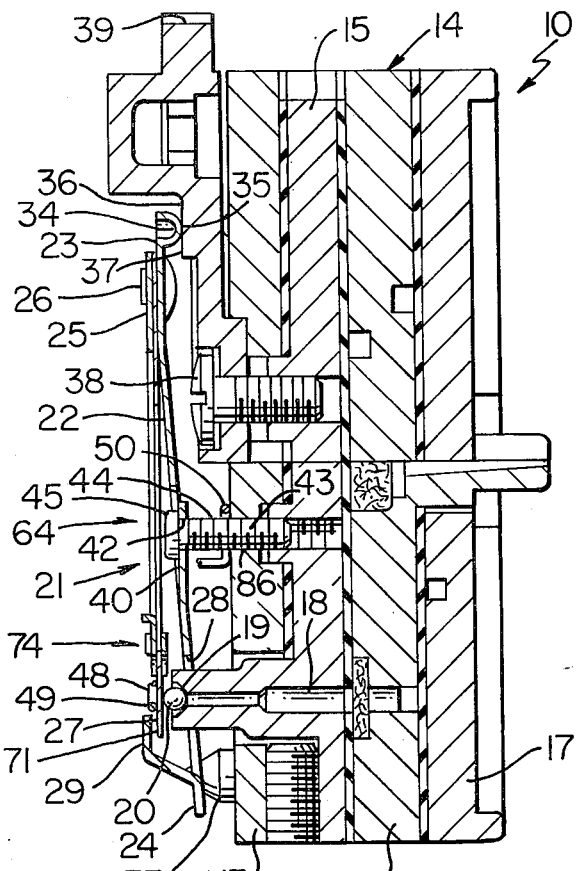
FIG. 3 is a cross-sectional view taken on line 3—3 of FIG. 2.
Figure 2:
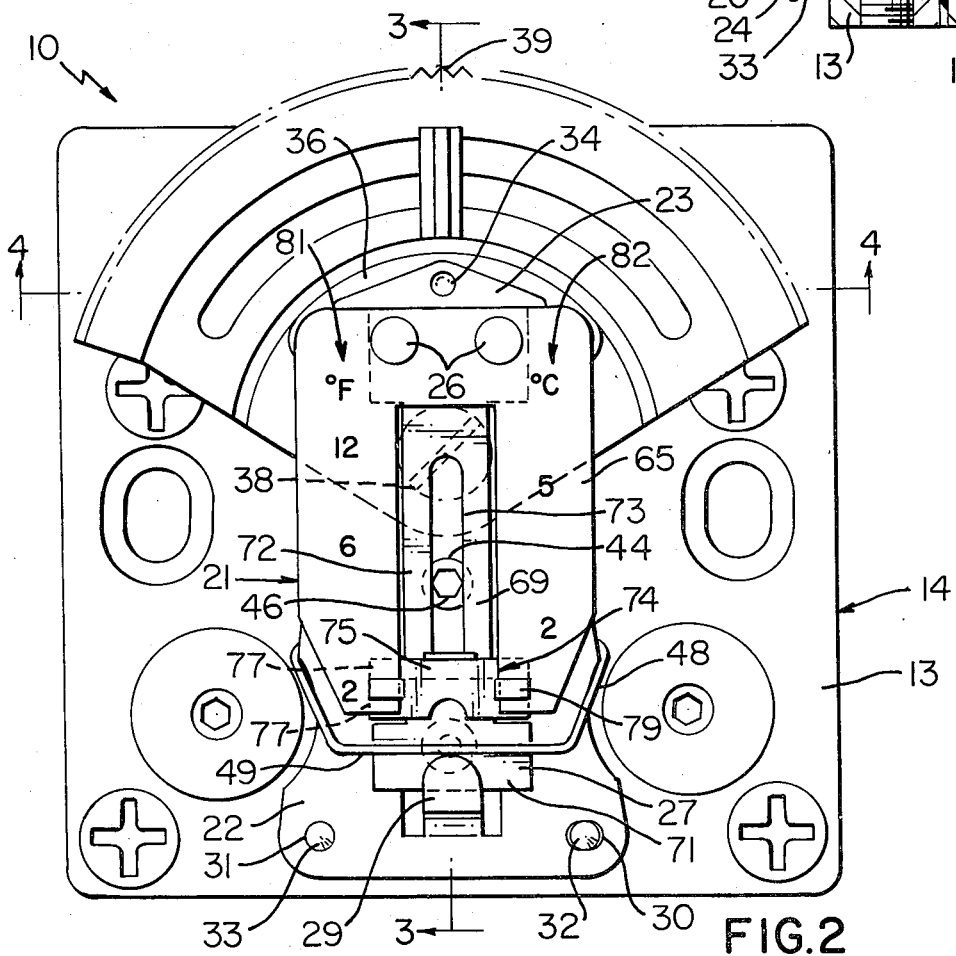
FIG. 2 is an enlarged front view of the device illustrated in FIG. 1 with the front cover thereof having been removed.
Figure 4:
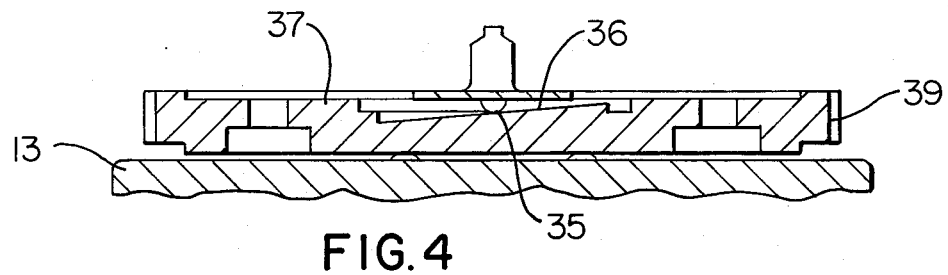
FIG. 4 is a fragmentary, cross-sectional view taken on line 4—4 of FIG. 2.

Referring now to FIGS. 1, 2, and 3, a temperature responsive device of this invention is generally indicated by the reference numeral 10 and comprises a casing means 11 having a front cover 12 adapted to be secured to a top plate 13 of a support means or frame structure 14, the support means 14 comprising a plurality of plates 13, 15, 16 and 17 disposed in stack relation and being suitably secured together to provide means for packaging a pneumatic control system therein, such as a pneumatic control system for operating a heat exchanger means in the manner set forth in U.S. Pat. Nos. 3,433,413 and 3,550,629.

However, such a pneumatic control system does not form a feature of this invention, and since such pneumatic control systems are fully described in the aforementioned U.S. patents, no further description of the pneumatic control system being regulated by the temperature responsive device 10 of this invention need be described other than to state that a passage 18 formed in the support means 14 comprises a passage for containing fluid under pressure that is adapted to be bled to the atmosphere through a valve seat 19 that is controlled by a ball valve member 20 urged toward its valve seat closing position by a bimetal arrangement of this invention that is generally indicated by the reference numeral 21 and which will now be described.

The bimetal arrangement 21 for the temperature responsive device 10 includes a lever 22 having opposed ends 23 and 24 respectively bearing against the support means 14 in a manner hereinafter described and a bimetal construction of this invention which is generally indicated by the reference numeral 64 and has one end 24 thereof secured to the end 23 of the lever 22 by any suitable fastening means, such as the rivet means 26 illustrated in the drawings. The other end 27 of the bimetal construction 64 is adapted to bear against the ball valve member 20 adjacent the end 24 of the lever 22 because the ball valve member 20 and its associated valve seat 19 are adapted to project through an opening 28 formed through the end 24 of the lever in the manner illustrated in FIG. 3.

A tongue 29 is formed at the end 24 of the lever 22 during the formation of the opening 28 therethrough with the tongue 29 being bent in an L-shape so as to overlie the end 27 of the bimetal construction 64, and, thus limit the upward movement of the end 27 of the bimetal construction 64 away from the valve seat 19.

The end 24 of the lever 22 has two openings 30 and 31 passing therethrough and respectively receiving conical pins 32 and 33 that project upwardly from the support means 14 so as to provide substantially a two point contact of the end 24 of the lever 22 with the support means 14. The other end 23 of the lever 22 is provided with a dimple 34 therein which defines an arcuate surface 35 that is adapted to bear against an arcuate cam surface 36 of an adjustable cam member 37 rotatably mounted to the support means 14 by a threaded fastening member 38, the cam member 37 being substantially sector shaped and being ribbed on the outer periphery 39 thereof so that the outer peripheral portion thereof projects out of the cover 11 in the manner illustrated in FIG. 1 and can be pushed by a finger of the operator to rotatably adjust the cam member 37 relative to the support means 14. In this manner, the arcuate cam surface 36 is adjusted to change the pivot position of the bimetal arrangement 21 in a manner hereinafter described for temperature selective purposes of the device 10.

Thus, it can be seen that the lever 22 is adapted to be effectively mounted at the opposed ends 23 and 24 thereof in bearing contact with the support means 14, the end 23 making substantially single point contact therewith while the end 24 makes substantially two point contact therewith to provide a substantially tripod arrangement for the lever 22.

In order to mount the bimetal arrangement 21 to the support means 14, a flexible tongue 40 is carved from an intermediate portion of the lever 22 between the ends 23 and 24 thereof with the tongue 40 being substantially triangular in shape and having the base part 41 thereof integrally hinged to the remainder of the lever 22. An opening 42 passes through the tongue 40 adjacent to the apex 63 thereof and loosely receives the threaded shank portion 43 of a calibration screw 44 therethrough, the calibration screw 44 having an enlarged head 45 which will not pass through the opening 42 and being provided with a hex opening 46 in the top surface 47 thereof for permitting the calibration screw 44 to be threadedly adjusted in a threaded hole 86 in the support means 14.

Thus, in order to mount the bimetal arrangment 21 to the support means 14, the calibration screw 44 is threaded into the threaded hole 86 and the enlarged head 45 thereof contacts against the lever 22 to cause the ends 23 and 24 thereof to make bearing contact with the support means 14 in the manner previously described whereby further inserting of the calibration screw 44 into the support means 14 causes the tongue 40 to flex downwardly and pull the spanning portion of the lever 22 downwardly and, thus, pull the end 27 of the bimetal construction 64 downwardly so that the same is in engagement with the ball valve member 20. In this manner, the bimetal construction 64 is given a greater spring force to tend to oppose opening movement of the ball valve member 20 as the calibration screw 44 is inserted into the support structure 14. Conversely, the bimetal construction 64 is given a lesser spring force to close the ball valve member 20 against the valve seat as the calibration screw 44 is threaded out of the support structure 14.

Thus, the calibration screw 44 is utilized for a dual purpose, namely, to provide the sole securement for the bimetal arrangement 21 to the support means 14 and to provide a means for calibrating the temperature responsive device so that the bimetal construction 64 will urge the ball valve member in engagement with the valve seat 19 with a certain force when the bimetal construction 64 is sensing a certain temperature.

Because the calibration screw 44 is interconnected to the lever 22 intermediate its ends 24 and 23, the bend line for the lever 22 is to the left of the set screw 44 and, thus, is closer to the ball valve seat 19 than the end 23 thereof, thus making the set point or calibration of the lever 22 less sensitive to movement at the cam end 23 thereof and allowing the use of greater cam rise on the cam surface 36. Such arrangement also makes the adjustments of the lever 22 less sensitive to screw rotation and, thus, making it simpler to calibrate.

In order to dampen vibration movement of the bimetal construction 64 through shocks and the like, a wire spring member 48 is provided and is disposed around the lever 22 and bimetal construction 64 adjacent the end 27 thereof in the manner illustrated in FIGS. 2 and 3 with the spring member 48 having one part 49 thereof bearing against the end 27 of the bimetal construction 64 and another portion 50 thereof bearing against the support means 14 so that the natural bias of the spring member 48 is in a direction to tend to move the end 27 of the bimetal construction 64 toward the lever 22.

The bimetal construction 64 is best illustrated in FIGS. 7 and 8 and comprises a first bimetal member 65 having substantially a U-shape defined by a yoke portion 66 and a pair of legs 67 extending from the yoke portion 66 and defining a substantially rectangularly shaped bite portion 68 therebetween.

The bimetal construction 64 also includes a second bimetal member 69 having opposed ends 70 and 71 which renders the second bimetal member 69 substantially elongated and with substantially an I-shape as illustrated in FIG. 7, the body portion 72 of the bimetal member 69 having an elongated slot 73 provided therethrough.

The rivet means 26 rivet the yoke end 66 and end 70 of the bimetal members 65 and 69 together and to the lever 22 to operatively interconnect the bimetal members 65 and 69 to the support means 14 whereby the end 71 of the second bimetal member 69 extends beyond the legs 67 of the bimetal member 65 while the body portion 72 thereof is disposed in the bight portion 68 of the bimetal member 65. The end 71 of the second bimetal member 69 operates against the ball 20 and is engaged by the portion 49 of the vibration dampening spring 48 as illustrated in FIGS. 2 and 3.

An adjustable means is provided for adjusting the force of the bimetal construction 64 acting on the ball valve member 20 and is generally indicated by the reference numeral 74.

Figure 6:
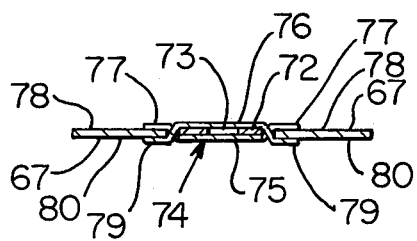
FIG. 6 is a fragmentary, cross-sectional view taken on line 6—6 of FIG. 5.

The adjustable means 74 comprises a slide that is formed of two slide parts 75 and 76 respectively disposed in sandwich relation on opposite sides of the body portion 72 of the second bimetal member 69 while the slide part 75 has two pairs of opposed tangs 77 engaging against the side 78 of the legs 67 of the bimetal member 65 and the slide part 76 has opposed tangs 79 engaging against the side 80 of the legs 67 of the bimetal member 65 as best illustrated in FIG. 6, the tangs 79 passing respectively through the spaces formed between the tangs 77 of the slide part 75.

Figure 5:
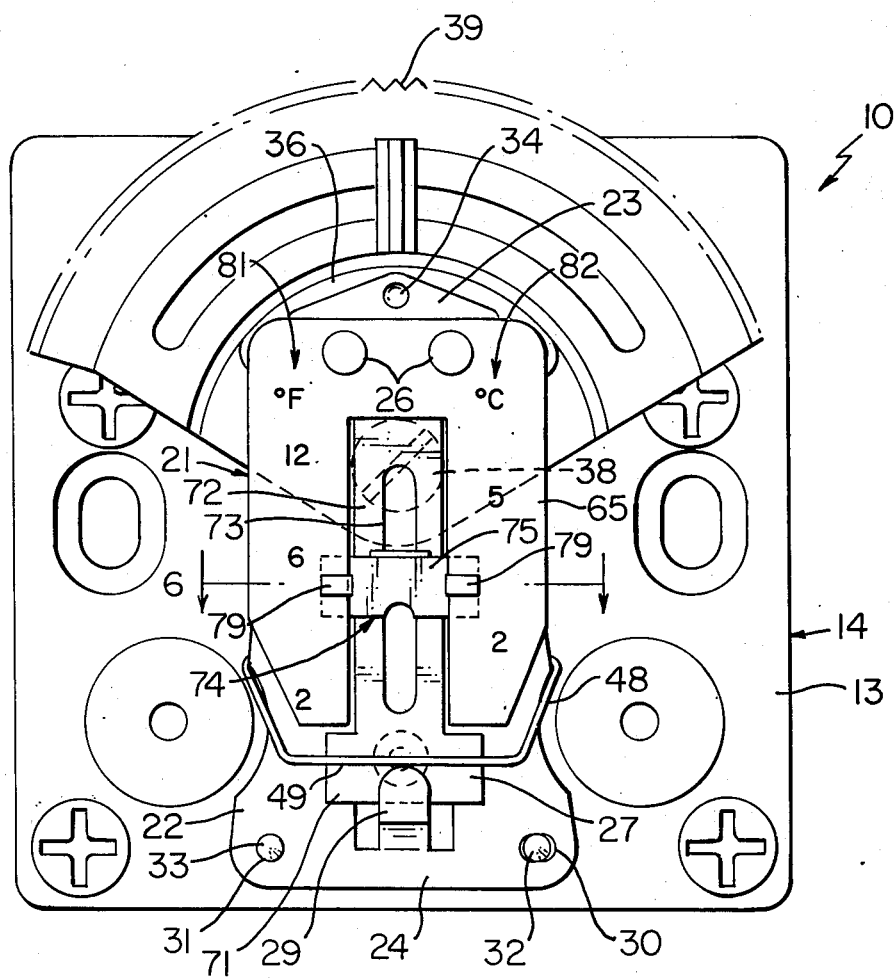
FIG. 5 is a view similar to FIG. 2 and illustrates the bimetal construction in another adjusted position thereof.

The tangs 77 and 79 of the slide parts 75 and 76 of the slide 74 are so constructed and arranged that the same, through the resiliency thereof in their assembled position with the bimetal members 69 and 65, will frictionally hold the slide 74 in any adjusted position along the axial length of the body part 72 of the bimetal member 69 as illustrated respectively in FIGS. 2 and 5.

In this manner, a temperature scale that is generally indicated by the reference numeral 81 in FIGS. 2 and 5 can be provided on the side 80 of the left-hand leg 67 of the bimetal member 66 to indicate the number of degrees Farinheidt depending upon the position of the slide 74 as represented by the left-hand tang 79 thereof in relation to the markings of the scale 81. Similarly, the side 80 of the other leg 67 of the bimetal member 65 can be provided with a scale that is generally indicated by the reference numeral 82 in FIGS. 2 and 5 to represent the number of degrees Centigrade 20 that the position of the right-hand tang 79 of the slide 74 relative to the scale 82 will indicate the adjusted position of the slide 74.

The bimetal member 65 is made thicker than the bimetal member 69 to cause the bimetal construction 64 to provide an adjustable throttling range.

In particular, the temperature responsive device 10 includes a force-balance system wherein the pressure in the chamber 18 acting on the effective area of the ball 20 produces a force which is balanced by the bimetal assembly 64 acting on the ball 20.

Since the force change produced by a restrained bimetal element, when it senses a temperature change, depends upon the amount of material in the element, should only the lighter bimetal member 69 be acting on the ball 20, it would require a large temperature change to produce the forces in the bimetal 69 necessary to drive the pressure in the chamber 18 from 3 psi to 15 psi. Conversely, the heavier bimetal member 65 could produce the same forces with only a small temperature change whereby the light bimetal 69 will produce a relatively small force change upon a temperature change of $x$ degress while the heavier bimetal 65 will produce a relatively large force change when it senses the same $x$ degree change. Thus, the throttling range (change in temperature necessary to produce a branch pressure change from 3 psi to 15 psi) depends upon the effective rate (force change vs. temperature change) of the bimetal system.

It has been found according to the teachings of this invention that utilizing the two bimetal members 65 and 69 of vastly different rates and coupling them together at various places produces an adjustable throttling range.

Accordingly, the slide 74 interconnects the legs 67 and the end 71 of the bimetal member 69 together in such a manner that the further away the slide 74 is relative to the end 71 of the bimetal member 69, the lesser the influence of the heavier bimetal member 65 is provided than when the slide 74 is closer to the end 71 thereof.

For example, it is desired to adjust the thermostat 10 from a condition where its output in the chamber 18 will vary from 3 psi to 15 psi when the temperature sensed varies + or − 1° F. (a 2° throttling range) from the set point of the thermostat 10 to a condition where the output in the chamber 18 varies from 3 psi to 15 psi when the temperature sensed varies + or − 6° F. (a 12° throttling range) from the set point of the thermostat 10. Accordingly, the slide 74 accomplishes this desired feature by selecting a portion of the heavy bimetal member 65 that will be effective and adding the rate of that portion to the rate of the light bimetal 69. Thus, if the slide 74 is positioned at "12° F" in FIG. 2, the heavy bimetal member 64 has almost no influence on the lighter bimetal member 69 and the unrestrained ends of the legs 67 merely wave in the air whereby the only forces acting on the ball 20 must be produced by the light bimetal member 69 and gives the widest throttling range.

If the slide 74 is moved to "6° F" position as illustrated in FIG. 5, the rate of about one-half of the heavy bimetal member 65 is added to that of the light bimetal member 69 and the throttling range is narrowed. The unrestrained ends 67 of the heavy bimetal member 65 that extend by the thus positioned slide 74 move with temperature change but produce no force on the ball 20. When the slide 74 is in the "2° F" position as illustrated in FIG. 2, the rate of the entire heavy bimetal member 65 is added to that of the light bimetal member 69 and forces on the ball necessary to drive the signal output from 3 psi to 15 psi are generated with a sensed temperature change of only 2° F.

Accordingly, it can be seen that it is a simple matter to adjust the throttling range for the control device 10 by merely sliding the slide 74 to the desired position relative to the scale 81 or 82 for a purpose now to be described.

As previously described, movement of the sector cam member 37 relative to the frame structure 14 positions the cam surface 36 relative to the end 23 of the lever 22 so that the same tends to cause the bimetal construction 64 to urge the ball valve member 20 toward the valve seat 19 with a certain force when the bimetal construction 64 is sensing a temperature that corresponds to the particular temperature setting of the cam member 37 relative to the housing means 14 as provided by an indicator 51 thereon being positioned adjacent a window 53 thereof that exposes the indicator 51 of the cam 37 to view. Thus, should the bimetal construction 64 not urge the ball valve member 20 toward the valve seat 19 with the proper force when the same is sensing the selected temperature of the selector cam 37, the calibration screw 44 is turned inwardly or outwardly as the case may be to provide such proper spring force on the ball valve 20.

Thus, once the calibration screw 44 has been properly set through the slot 73 of the bimetal member 69, and the operator has selected the desired temperature setting of the selector cam 37, should the temperature rise above the selected temperature thereof, the bimetal construction 64 will urge the ball valve member 20 toward the valve seat 19 with a greater force, if the bimetal construction 64 warps toward the valve seat 19 upon the temperature rise, whereby fluid pressure bleeding from the passage 18 through the valve seat 19 will decrease. Under such circumstances, the bimetal construction 64 will urge the ball valve member 20 toward the valve seat 19 with a lesser force should the same be sensing a temperature below the selected temperature of the selector cam 37 whereby the fluid pressure bleed from the passage 18 through the valve seat 19 will increase.

Thus, by the operator selecting the desired position for the slide 74 relative to the scale 81 or 82, the bimetal construction 64 will cause the pressure in the passage 18 to go from 3 psi to 15 psi when a certain temperature differential is sensed relative to the selected temperature of the selector 37. For example, should the selector cam 37 be set for 70° F. and the slide 74 set for a "6° F." throttling range as illustrated in FIG. 5, the pressure of the fluid in the passage 18 will be at approximately 9 psi when the bimetal construction 64 is sensing 70° F. and will be at approximately 15 psi when the bimetal construction 64 is sensing 73° F. and at approximately 3 psi when the bimetal construction is sensing 67° F.

Conversely, should the bimetal construction 64 be reverse acting, that is, the bimetal construction 64 warping away from the valve seat 19 upon sensed temperature rise, then the bimetal construction 64 will urge the ball valve member 20 toward the valve seat 19 with a lesser force as the temperature sensed thereby increases beyond the set temperature thereof and will urge the ball valve member 20 toward the valve seat 19 with a greater force as the temperature falls below the selected temperature setting of the cam member 37, the slide 74 performing its selected temperature differential function as previously described.

Therefore, it can be seen that the bimetal arrangement 21 of this invention readily permits the same to be assembled to the supporting structure 14 by a single calibrating screw 44 with the single calibrating screw 44 being effective to provide accurate calibration of the bimetal arrangement 21. Such bimetal arrangement 21 also readily permits the temperature setting thereof to be adjusted by the movable cam member 37 in the manner previously described.

Further, by having the bimetal construction 64 adjustable, the throttling range for the control device is adjustable.

Therefore, it can be seen that this invention not only provides an improved adjustable bimetal construction and method of making the same, but also this invention provides an improved temperature responsive device utilizing such bimetal construction.

While the form and method of this invention now preferred have been described as required by the Patent Statute, it is to be understood that other forms and method steps can be utilized and still fall within the scope of the appended claims.

What is claimed is:

1. An adjustable bimetal construction adapted to provide an adjustable throttling range and comprising a frame means, a first bimetal member having opposed ends one of which is operatively interconnected to said frame means while the other end is movable relative to said frame means, a second bimetal member having opposed ends one of which is operatively interconnected to said frame means while the other end thereof is movable relative to said frame means, and adjustable means operatively interconnecting said other ends of said bimetal members together to provide a combined bimetal action at said other ends, said first bimetal member being thicker than said second bimetal member, said first bimetal member being substantially U-shaped with the yoke portion thereof defining said one end thereof and the free ends of the legs thereof defining said other end thereof, said second bimetal member being an elongated length with said one end thereof being secured to said yoke portion and with said other end thereof extending beyond said legs while the body portion of said second bimetal member is intermediate said legs.

2. An adjustable bimetal construction as set forth in claim 1 wherein said adjustable means comprises a slide member that interconnects said body portion of said second bimetal member to said legs of said first bimetal member.

3. An adjustable bimetal construction as set forth in claim 2 wherein said slide member comprises two parts that sandwich said second bimetal member therebetween, each part having a pair of outwardly extending tangs respectively engaging said legs on the side thereof opposite to the side of said legs against which said tangs of the other part engage.

4. An adjustable bimetal construction as set forth in claim 3 wherein at least one of said legs has a scale thereon whereby an associated tang cooperates with said scale to indicate the action of said bimetal construction as set by said slide.

5. In a temperature responsive device having a lever carried by a support means and a bimetal construction provided with one end being secured to said lever and with the other end being operatively associated with an operable member being carried by said support means, the improvement wherein said bimetal construction is adjustable to provide an adjustable throttling range for said device and comprises a first bimetal member having opposed ends one of which is operatively interconnected to said lever while the other end is movable relative to said support means, a second bimetal member having opposed ends one of which is operatively interconnected to said lever while the other end thereof is movable relative to said support means, and adjustable means operatively interconnecting said other ends of said bimetal members together to provide a combined bimetal action at said other ends for operating said operable member, said adjustable means being adapted to change the point of interconnection between said other ends of said bimetal members and thereby vary the length of said other ends that are free from each other and extend beyond the point of interconnection therebetween.

6. In a temperature responsive device as set forth in claim 5, said adjustable means comprising a slide member that can be moved relative to said members to change the point of interconnection therebetween.

7. In a temperature responsive device as set forth in claim 6, said first bimetal member being thicker than said second bimetal member.

8. In a temperature responsive device having a lever carried by a support means and a bimetal construction provided with one end being secured to said lever and with the other end being operatively associated with an operable member being carried by said support means, the improvement wherein said bimetal construction is adjustable to provide an adjustable throttling range for said device and comprises a first bimetal member having opposed ends one of which is operatively interconnected to said lever while the other end is movable relative to said support means, a second bimetal member having opposed ends one of which is operatively interconnected to said lever while the other end thereof is movable relative to said support means, and adjustable means operatively interconnecting said other ends of said bimetal members together to provide a combined bimetal action at said other ends for operating said operable member, said adjustable means comprising a slide member that can be moved relative to said members to change the point of interconnection therebetween, said first bimetal member being thicker than said second bimetal member, said first bimetal member being substantially U-shaped with the yoke portion thereof defining said one end thereof and the free ends of the legs thereof defining said other end thereof, said second bimetal member being an elongated length with said one end thereof being secured to said yoke portion and with said other end thereof extending beyond said legs while the body portion of said second bimetal member is intermediate said legs.

9. In a temperature responsive device as set forth in claim 8, said adjustable means comprising a slide member that interconnects said body portion of said second bimetal member to said legs of said first bimetal member.

10. In a temperature responsive device as set forth in claim 9, said slide member comprising two parts that sandwich said second bimetal member therebetween, each part having a pair of outwardly extending tangs respectively engaging said legs on the side thereof opposite to the side of said legs against which said tangs of the other part engage.

11. In a temperature responsive device as set forth in claim 10, at least one of said legs having a scale thereon whereby an associated tang cooperates with said scale to indicate the action of said bimetal construction as set by said slide.

12. A method for making an adjustable bimetal construction adapted for providing an adjustable throttling range and comprising the steps of providing a frame means, providing a first bimetal member having opposed ends, operatively interconnecting one end to said frame means while the other end is movable relative to said frame means, providing a second bimetal member having opposed ends, operatively interconnecting one end of said second bimetal member to said frame means while the other end thereof is movable relative to said frame means, operatively interconnecting said other ends of said bimetal members together with adjustable means to provide a combined bimetal action at said other ends, forming said first bimetal member so as to be thicker than said second bimetal member, forming said first bimetal member so as to be substantially U-shaped with the yoke portion thereof defining said one end thereof and the free ends of the legs thereof defining said other end thereof, forming said second bimetal member so as to be an elongated length, and securing said one end of said second bimetal member to said yoke portion so that said other end thereof extends beyond said legs while the body portion of said second bimetal member is disposed intermediate said legs.

13. A method as set forth in claim 12 and including the step of forming said adjustable means from a slide member that interconnects said body portion of said second bimetal member to said legs of said first bimetal member.

14. A method as set forth in claim 13 and including the steps of forming said slide member from two parts that sandwich said second bimetal member therebetween, and forming each part to have a pair of outwardly extending tangs respectively engaging said legs on the side thereof opposite to the side of said legs against which said tangs of the other part engage.

15. A method as set forth in claim 14 and including the step of forming at least one of said legs with a scale thereon whereby an associated tang cooperates with said scale to indicate the action of said bimetal construction as set by said slide.

* * * * *